H. L. PANGBORN.
NUT LOCK.
APPLICATION FILED MAR. 20, 1920.
1,360,143. Patented Nov. 23, 1920.
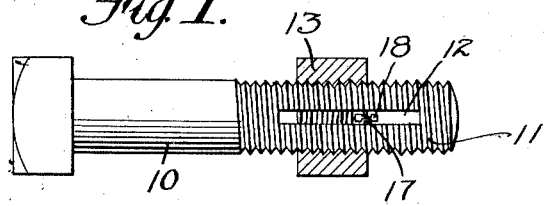
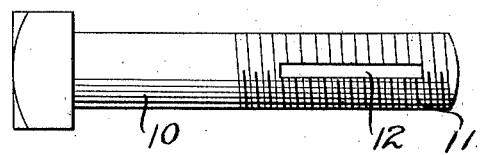
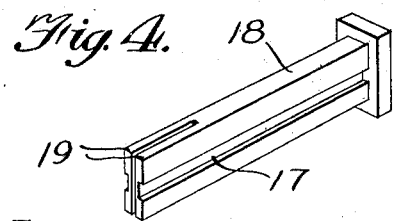
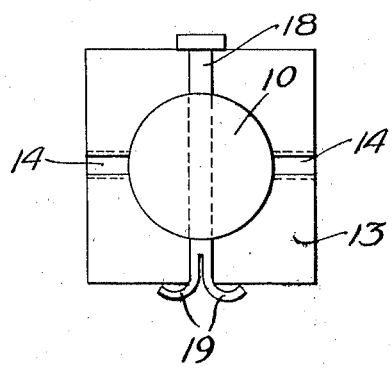
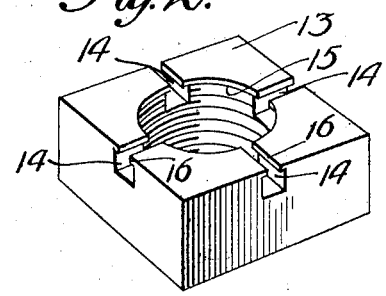
H. L. Pangborn
INVENTOR
BY Victor J. Evans
ATTORNEY
WITNESS:

UNITED STATES PATENT OFFICE.

HERBERT L. PANGBORN, OF MAQUOKETA, IOWA.

NUT-LOCK.

1,360,143.     Specification of Letters Patent.     Patented Nov. 23, 1920.

Application filed March 20, 1920. Serial No. 367,347.

*To all whom it may concern:*

Be it known that I, HERBERT L. PANGBORN, a citizen of the United States, residing at Maquoketa, in the county of Jackson and State of Iowa, have invented new and useful Improvements in Nut-Locks, of which the following is a specification.

This invention relates to nut locks and embodies among other features, a locking key adapted to be associated with the nut and passed through a slot in the bolt subsequent to the adjustment of the nut upon the bolt, the locking key being finally bent to contact one side of the nut to prevent the latter from becoming disengaged therefrom.

More specifically stated, the nut with which the key is used is provided on one side with a plurality of grooves intersecting the bolt of the nut, and adapted to register with a slot in the bolt, so that when the locking pin is passed through any of said grooves in said slot, and its ends bent against the edge of the nut, the latter will be held upon the bolt against retrograde movement.

Another object of the invention resides in providing the locking key with longitudinal grooves on each side to receive the opposed edges of the grooves of the nut, so that when the key is inserted in the groove of the nut it will be held associated therewith.

The nature and advantages of the invention will be better understood when the following detail description is read in connection with the accompanying drawings, the invention residing in the construction, combination and arrangement of parts as claimed.

In the drawings forming part of this application, like numerals of reference indicate similar parts in the several views and wherein:—

Figure 1 is a sectional view taken through a bolt and nut showing the latter locked upon the bolt by means of the invention.

Fig. 2 is a perspective view of the nut.

Fig. 3 is a view of the bolt.

Fig. 4 is a perspective view of the locking element.

Fig. 5 is an end elevation of the nut and bolt associated and locked together by means of the invention.

Referring to the drawings in detail, 10 indicates a bolt including a threaded shank 11, which is provided with an elongated slot 12 extended longitudinally of the bolt as shown. The nut is indicated at 13 and is of any suitable construction, except that on one side it is provided with a plurality of grooves 14 which intersect the bore 15. The grooves may be of any suitable cross-sectional configuration, but have their edges closely associated and tapered as at 16 to be received within the longitudinal grooves 17 formed in the opposite faces or sides of the locking key 18. The locking key is split at one end in a line with the grooves thereof, the separated portions 19 defined by the split being adapted to be bent against one edge of the nut to hold the latter against retrograde movement upon the bolt. In practice, the nut is screwed upon the bolt and adjusted in the usual manner. When the nut has been given its final position upon the bolt, the locking pin is inserted in one of the grooves of the nut and passed through said groove and slot in the bolt. The tapered edges 16 of the grooves are received by the grooves of the locking key and in this manner the key is held operatively associated with the nut. When the key has been passed through the nut and bolt as stated, the separated portions 19 at one end of the key are bent in opposite directions to bear against the adjacent edge of the nut to hold the latter against retrograde movement upon the bolt.

While it is believed that from the foregoing description, the nature and advantages of the invention will be readily apparent, I desire to have it understood that I do not limit myself in this connection, and that such changes may be resorted to as fall within the scope of what is claimed.

Having thus described my invention what I claim as new is:

The combination with a bolt having a longitudinal slot and a nut provided with a plurality of grooves at one side thereof, of a locking key including a head and a stem of uniform dimensions throughout its length, said stem having grooves in its opposite sides co-extensive in length therewith, said grooves being adapted to receive the edges of the grooves of said nut when the key is passed therethrough and through the slot of the bolt, the head of the key bearing against one side of the nut and the free end of the key projecting beyond the opposite side, said free end being slit longitudinally for a portion of its length to provide bendable members adapted to bear against the opposite sides of the nut.

In testimony whereof I affix my signature.

HERBERT L. PANGBORN.